United States Patent
Ivarsson et al.

(10) Patent No.: US 12,120,610 B2
(45) Date of Patent: Oct. 15, 2024

(54) FINE TUNING RADIO UNIT PERFORMANCE

(71) Applicant: Dell Products L.P., Round Rock, TX (US)

(72) Inventors: Tommy Ivarsson, Ottawa (CA); Sewvanda Don, Ottawa (CA); John Bradley Deforge, Chelsea (CA)

(73) Assignee: DELL PRODUCTS L.P., Round Rock, TX (US)

( * ) Notice: Subject to any disclaimer, the term of this patent is extended or adjusted under 35 U.S.C. 154(b) by 143 days.

(21) Appl. No.: 17/660,356

(22) Filed: Apr. 22, 2022

(65) Prior Publication Data

US 2023/0345367 A1    Oct. 26, 2023

(51) Int. Cl.
| | |
|---|---|
| H04B 1/10 | (2006.01) |
| H04B 1/40 | (2015.01) |
| H04B 17/15 | (2015.01) |
| H04W 52/02 | (2009.01) |

(52) U.S. Cl.
CPC .......... *H04W 52/0225* (2013.01); *H04B 1/40* (2013.01); *H04B 17/15* (2015.01)

(58) Field of Classification Search
CPC .... H04W 52/0225; H04W 52/02; H04B 1/40; H04B 17/15; H04B 1/0475; H04B 1/10; H04B 1/1027; H04B 1/38
See application file for complete search history.

(56) References Cited

U.S. PATENT DOCUMENTS

| | | | | |
|---|---|---|---|---|
| 11,802,934 | B2* | 10/2023 | Berthele | G01S 5/0205 |
| 2005/0184922 | A1* | 8/2005 | Ida | H01Q 23/00 |
| | | | | 333/17.3 |
| 2011/0281533 | A1* | 11/2011 | Deleus | G06F 3/0338 |
| | | | | 341/20 |
| 2012/0093202 | A1* | 4/2012 | Tsuchida | H04B 1/38 |
| | | | | 375/219 |
| 2012/0097415 | A1* | 4/2012 | Reinert | H01L 27/14683 |
| | | | | 174/50 |
| 2018/0090967 | A1* | 3/2018 | Saunamaki | H02J 50/005 |
| 2019/0207642 | A1* | 7/2019 | Reynolds | H04B 1/18 |
| 2020/0068570 | A1 | 2/2020 | Khan et al. | |
| 2020/0169334 | A1 | 5/2020 | Li et al. | |
| 2020/0204419 | A1 | 6/2020 | Megretski et al. | |
| 2023/0254009 | A1* | 8/2023 | Chuang | G08B 21/182 |
| | | | | 375/228 |

OTHER PUBLICATIONS

International Search Report and Written Opinion mailed May 30, 2023 for PCT Application No. PCT/US2022/053285, 17 pages.
Invitation to Pay Additional Fees mailed Apr. 6, 2023 for PCT Application No. PCT/US2022/053285, 12 pages.

* cited by examiner

*Primary Examiner* — Andrew Wendell

(74) *Attorney, Agent, or Firm* — Amin, Turocy & Watson, LLP

(57) ABSTRACT

A system can comprise a radio unit. The system can further comprise a power detector that is configured to determine characteristics of incident signal data traffic of the radio unit. The system can further comprise an actuator that is configured to modify an operational parameter of the radio unit, wherein modifying the operational parameter of the radio unit alters performance of the radio unit. The system can further comprise a hardware component that is configured to cause the actuator to modify the operational parameter of the radio unit based on analyzing the incident signal data traffic.

20 Claims, 12 Drawing Sheets

300

```
┌─────────────────────────────────────────────────────┐
│  ┌───────────────────────────────────────────────┐  │
│  │  FIRST HARDWARE COMPONENT THAT IS CONFIGURED TO│  │
│  │  DETERMINE INCIDENT SIGNAL DATA TRAFFIC THAT  │  │
│  │       TRAVELS THROUGH A RADIO UNIT 302        │  │
│  └───────────────────────────────────────────────┘  │
│                                                     │
│  ┌───────────────────────────────────────────────┐  │
│  │ SECOND HARDWARE COMPONENT THAT IS CONFIGURED  │  │
│  │ TO CAUSE AN ACTUATOR OF THE RADIO UNIT TO MODIFY│ │
│  │  THE OPERATIONAL PARAMETER OF THE RADIO UNIT  │  │
│  │  BASED ON ANALYZING THE INCIDENT SIGNAL DATA  │  │
│  │ TRAFFIC THAT TRAVELS THROUGH THE RADIO UNIT 304│ │
│  └───────────────────────────────────────────────┘  │
└─────────────────────────────────────────────────────┘
```

```
┌─────────────────────────────────────────────────┐
│                                                 │
│  ┌───────────────────────────────────────────┐  │
│  │  FIRST HARDWARE COMPONENT THAT IS         │  │
│  │  CONFIGURED TO DETERMINE INCIDENT SIGNAL  │  │
│  │  DATA TRAFFIC OF A RADIO UNIT 402         │  │
│  └───────────────────────────────────────────┘  │
│                                                 │
│  ┌───────────────────────────────────────────┐  │
│  │  SECOND HARDWARE COMPONENT THAT IS        │  │
│  │  CONFIGURED TO CAUSE AN ACTUATOR OF THE   │  │
│  │  RADIO UNIT TO MODIFY THE OPERATIONAL     │  │
│  │  PARAMETER OF THE RADIO UNIT BASED ON     │  │
│  │  ANALYZING THE INCIDENT SIGNAL DATA       │  │
│  │  TRAFFIC 404                              │  │
│  └───────────────────────────────────────────┘  │
│                                                 │
│  ┌───────────────────────────────────────────┐  │
│  │  THIRD HARDWARE COMPONENT THAT IS         │  │
│  │  CONFIGURED TO INJECT A CUSTOM SIGNAL IN  │  │
│  │  A RADIO SIGNAL CHAIN OF THE RADIO UNIT,  │  │
│  │  WHEREIN THE INCIDENT SIGNAL DATA         │  │
│  │  TRAFFIC IS BASED ON THE CUSTOM SIGNAL    │  │
│  │  406                                      │  │
│  └───────────────────────────────────────────┘  │
│                                                 │
└─────────────────────────────────────────────────┘
```

```
┌─────────────────────────────────────────────────────┐
│  ┌───────────────────────────────────────────────┐  │
│  │ FIRST HARDWARE COMPONENT THAT IS CONFIGURED TO│  │
│  │ DETERMINE INCIDENT SIGNAL DATA TRAFFIC OF A   │  │
│  │ RADIO UNIT 502                                │  │
│  └───────────────────────────────────────────────┘  │
│                                                     │
│  ┌───────────────────────────────────────────────┐  │
│  │ SECOND HARDWARE COMPONENT THAT IS CONFIGURED  │  │
│  │ TO CAUSE AN ACTUATOR OF THE RADIO UNIT TO     │  │
│  │ MODIFY THE OPERATIONAL PARAMETER OF THE RADIO │  │
│  │ UNIT BASED ON ANALYZING THE INCIDENT SIGNAL   │  │
│  │ DATA TRAFFIC 504                              │  │
│  └───────────────────────────────────────────────┘  │
│                                                     │
│  ┌───────────────────────────────────────────────┐  │
│  │ THIRD HARDWARE COMPONENT THAT IS CONFIGURED TO│  │
│  │ CAPTURE TWO SIMULTANEOUS TIME ALIGNED BLOCKS  │  │
│  │ OF DIFFERENT DATA FROM TAP POINTS IN A DIGITAL│  │
│  │ FRONT END CHAIN OF THE RADIO UNIT, WHEREIN    │  │
│  │ THE INCIDENT SIGNAL DATA TRAFFIC IS BASED ON  │  │
│  │ THE TWO SIMULTANEOUS TIME ALIGNED BLOCKS OF   │  │
│  │ DIFFERENT DATA 508                            │  │
│  └───────────────────────────────────────────────┘  │
└─────────────────────────────────────────────────────┘
```

FIG. 5

FINE TUNING RADIO UNIT PERFORMANCE

BACKGROUND

A radio can comprise a receiver and a transmitter that are used to receive and transmit, respectively, data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a radio unit. The system can further comprise a power detector that is configured to determine characteristics of incident signal data traffic of the radio unit. The system can further comprise an actuator that is configured to modify an operational parameter of the radio unit, wherein modifying the operational parameter of the radio unit alters performance of the radio unit. The system can further comprise a hardware component that is configured to cause the actuator to modify the operational parameter of the radio unit based on analyzing the incident signal data traffic.

An example method can comprise determining, by a system comprising a processor, incident signal data traffic that travels through a radio unit. The method can further comprise causing, by the system, an actuator of the radio unit to modify the operational parameter of the radio unit based on analyzing the incident signal data traffic that travels through the radio unit.

An example apparatus can comprise a first hardware component that is configured to determine incident signal data traffic that travels through a radio unit. The apparatus can further comprise a second hardware component that is configured to cause an actuator of the radio unit to modify the operational parameter of the radio unit based on analyzing the incident signal data traffic that travels through the radio unit.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates another example system architecture that can facilitate fine tuning amplifier performance, in accordance with an embodiment of this disclosure;

FIG. 4 illustrates another example system architecture that can facilitate fine tuning amplifier performance, in accordance with an embodiment of this disclosure;

FIG. 5 illustrates another example system architecture that can facilitate fine tuning amplifier performance, in accordance with an embodiment of this disclosure;

DETAILED DESCRIPTION

Overview

Figure 1A:
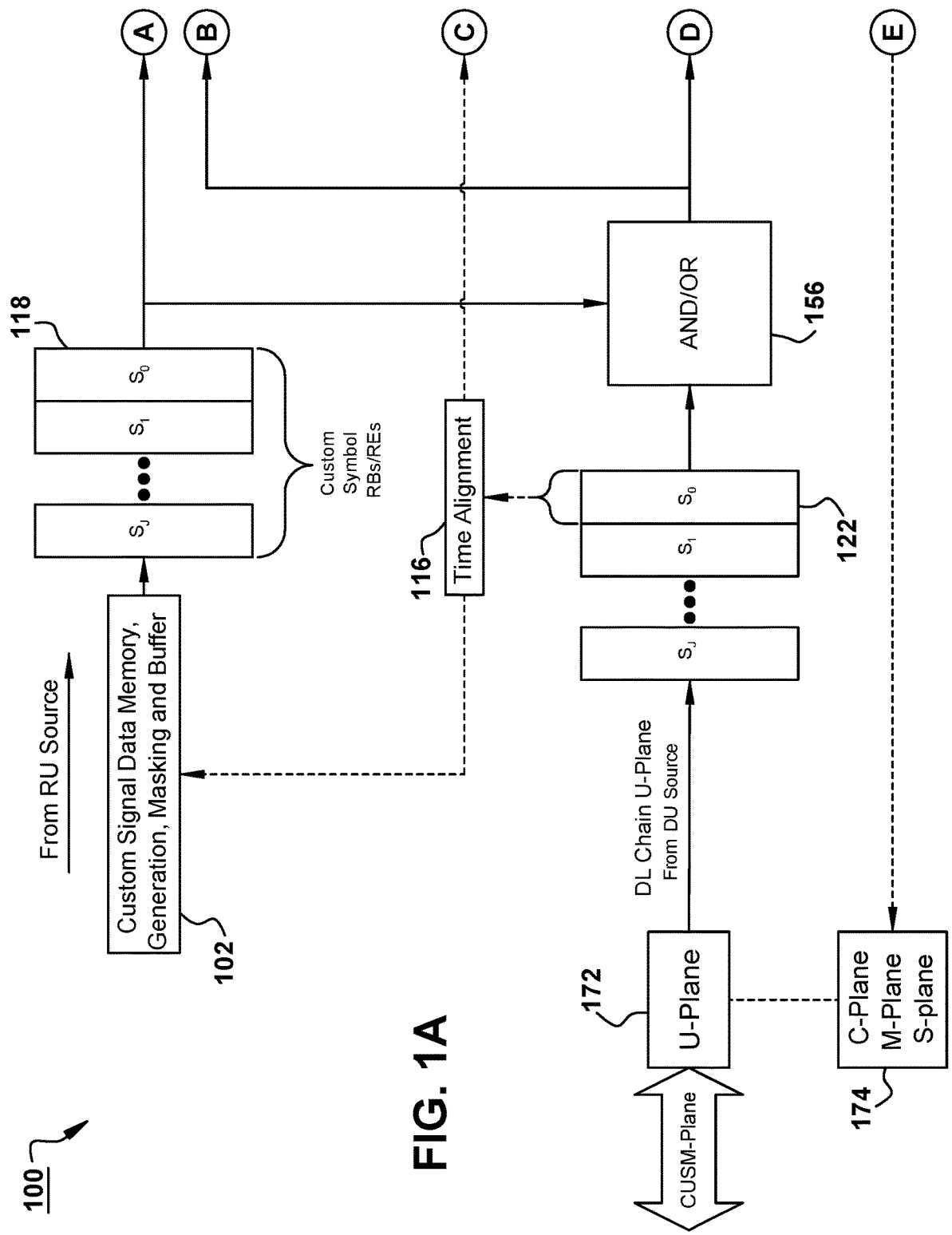
FIG. 1A, FIG. 1B, and FIG. 1C illustrate an example system architecture that can facilitate fine tuning amplifier performance, in accordance with an embodiment of this disclosure.

In modern wireless communications deployments, aspects and impacts of radio development engineering and system design tradeoffs can have far-reaching implications into customer capital expenditures, operating expenditures and overall completeness of a vendor's radio offerings. These engineering and systems design tradeoffs can result in what can be generally characterized as overall radio size, weight, thermal dissipation, reliability, complexity, and cost.

In some radio systems, amplifiers can consume greater than 50% of the power consumed by the radio system, and produce approximately 50% of the heat to be dissipated within the physical dimensions of the radio. In some examples, a key driver of radio design can therefore be amplifier design and an ability to derive efficiency improvements.

In some examples, radio unit-based analysis of data can be performed, and used to modify a radio's operating parameters. In some examples, signal data can be stored and subsequently used for near- and long-term historical and statistical performance evaluation to modify a radio's operating parameters.

An ability to capture, analyze, and store key frequency and time domain data can facilitate tuning or fine tuning radio performance parameters, which can include radio unit performance modifications.

An overall efficiency, and therefore user operating expenses, can be directly tied to radio performance and efficiency optimization. Fine tuning radio parameters can facilitate providing a compelling offering to users.

In some examples, actuators in a radio unit are accessible for modification through deterministic or prescriptive approaches to effect operational efficiency performance in a timely fashion.

In some examples, operational efficiency can be improved through opportunistic and autonomous analysis of signal data performance parameters. In some examples, error vector magnitude (EVM) data can be measured in signal data. In some examples, operating band unwanted emission (OBUE) data can be measured in signal data.

In some examples, a radio unit can operate autonomously based on data observed for near- and long-term historical and statistical performance from signal data stored using statistical counters and accumulators. In some examples, signal data can be analyzed for EVM performance with dynamic traffic over time. In some examples, signal data can be analyzed for OBUE performance with dynamic traffic over time.

In some examples, operational parameter modifications can be timed and synchronized along system timing boundaries. That is, a time alignment block can be implemented to perform gating and triggering operations to start, stop, and/or pause key aspects of custom signal creation and parameters.

Regarding modifying operational parameters, this can be performed during periods where there is not a disruption to over-the-air performance. An example of this can be as follows. The power amplifier (PA) bias can be updated during live-air transmission, but this could cause at least two catastrophic problems. One such problem could be that a significant glitch in the bias can result in an out-of-specification transmission of a signal that does not meet regulatory standards, and could possibly knock other radios off the air temporarily. Another such problem could be that the sudden change in bias would need to be performed in conjunction/coordination with digital pre-distortion (DPD) to ensure that emissions of the channel are sufficiently corrected. A bias change could invalidate previous (that is, previously frozen) DPD actuator values.

In some examples, a radio unit adapts to traffic dynamicity to achieve higher operational efficiency.

The present techniques can improve radio unit efficiency through modification of configurable operational parameters. Reconfiguration of operational parameters can be controlled by actuators, where control can be facilitated by deterministic or prescribed approaches based on an analysis of data performed, or via messaging received at a radio unit.

In some examples, the present techniques can be implemented to provide coverage for all antenna branches of a radio system. The present techniques can provide an ability to inject and/or capture signal data from a radio unit for analysis, storage, processing, and/or comparison.

Actuators in a radio unit can be accessible for modification through such techniques as deterministic or prescriptive approaches to affect operational efficiency performance in a timely fashion.

In some examples, a radio unit can perform a change to a power amplifier (PA) bias via actuators to control PA supply voltage ($V_{dd}$) and gate biases for a purpose of improving (e.g., lessening) power consumption of the radio. In some examples, a radio unit can modify crest factor reduction (CFR) parameters to improve (e.g., lessen) radio power consumption.

In some examples, the present techniques can be implemented to provide a radio unit with an ability to operate opportunistically and autonomously, without interaction with a distributed unit. A radio unit can leverage power detectors to determine incident signal data traffic. An incident signal can generally comprise a "clean signal"—that is, a signal in its original form upon entering a radio system. An incident signal can generally comprise that which has not yet passed through a transfer function or been terminated in any way by a receiving device/unit/radio. In some cases, signal data can be analyzed regarding EVM performance. In some cases, signal data can be analyzed regarding OBUE performance.

In some examples, a radio unit can use live-air data, non-live-air data, or a combination of live-air data and non-live-air data to opportunistically determine performance improvements. A radio unit can be reconfigured based on signal data capture, storage, and/or analysis to advantageously modify system performance.

In some examples, captured signal data can be used for deterministically-based or prescription-based analysis to affect changes to actuator parameters to improve radio performance. In some cases, the performance can be modified to provide energy savings in a network deployment.

In some examples, the present techniques can be implemented to provide a radio unit with an ability to operate opportunistically and autonomously, without interaction with a distributed unit. A radio unit can leverage power detectors to determine incident signal data traffic. In some cases, signal data can be analyzed regarding EVM performance. In some cases, signal data can be analyzed regarding OBUE performance. EVM and OBUE can generally comprise two deeper laboratory-like tests that can be performed on a radio itself using the present techniques. In prior approaches, it can be that these tests and an ability to perform them is not normally developed nor available internal to a radio without implementing the present techniques to allow these metrics to be measured and/or hardware accelerated using preconditioning of the data.

A radio unit can reconfigure performance parameters to optimize for traffic load dynamicity. A radio unit reconfiguration based on knowledge of traffic can be performed to modify system performance.

In some examples, traffic loading can be further used for deterministically-based or prescription-based analysis to affect changes to actuator parameters to improve radio performance. In some cases, the performance can be modified to provide energy savings in a network deployment.

In some examples, radio operational parameters can be controlled to optimize for a desired performance of a radio. An example of desired performance can be to improve efficiency. Another example of desired performance can be to improve an EVM metric. Another example of desired performance can be to improve transmission spectral purity.

The present techniques can be implemented to facilitate modifying radio operational parameters using the following. Custom waveforms or signals can be injected at points in a radio signal chain. Tap points can be implemented in a radio to capture signal data at locations in a digital front end (DFE) chain were signals can be synchronously and simultaneously routed to more than one termination point, without impact to signal quality.

In some examples, down link (DL) data can be processed with a Fast Fourier Transform (FFT) and/or cyclic prefix (CP) removal. In some examples, multiple time aligned blocks of different data from tap points in a digital front end chain can be captured before passing to an analysis block.

Captured data can be analyzed to produce control signals for modifying radio performance. Data can be stored, and results can be analyzed.

In some examples, data analysis can be performed as part of a deterministic or prescriptive approach to control amplifier $V_{dd}$ and other amplifier biases to optimize performance. In some examples, amplifier $V_{dd}$ and other biases can be fine-tuned. Both tuning and fine-tuning can comprise types of controlling amplifier biases, which can be performed for a purpose of optimization for a given desired outcome. In some examples, the present techniques can be implemented to provide control over blocks, such as a CFR block.

That is, the present techniques can be implemented to affect a stimulus, which can be a clean or known incident signal that is measured at the input and/or injected. The present techniques can be implemented to affect a response, which can be what changed after passing through blocks of a radio (transfer function), and can involve hardware acceleration/preselecting/preconditioning of resulting captured data performed in a manner that provides for real-time analysis via an analysis block. The present techniques can be implemented to affect an actuator, which can modify a radio's operational parameters in real-time, or near real-time.

Through implementing the present techniques to affect a stimulus, a response, and an actuator, an actuator can deterministically or prescriptively modify directly, or cause to be modified, at a mutually-beneficial time boundary, registers affecting particular operational blocks. These blocks can include blocks that affect crest factor reduction (CFR), power amplifier (PA) bias, input signal data masking, and/or time gating.

Example Architectures

Figure 1B:
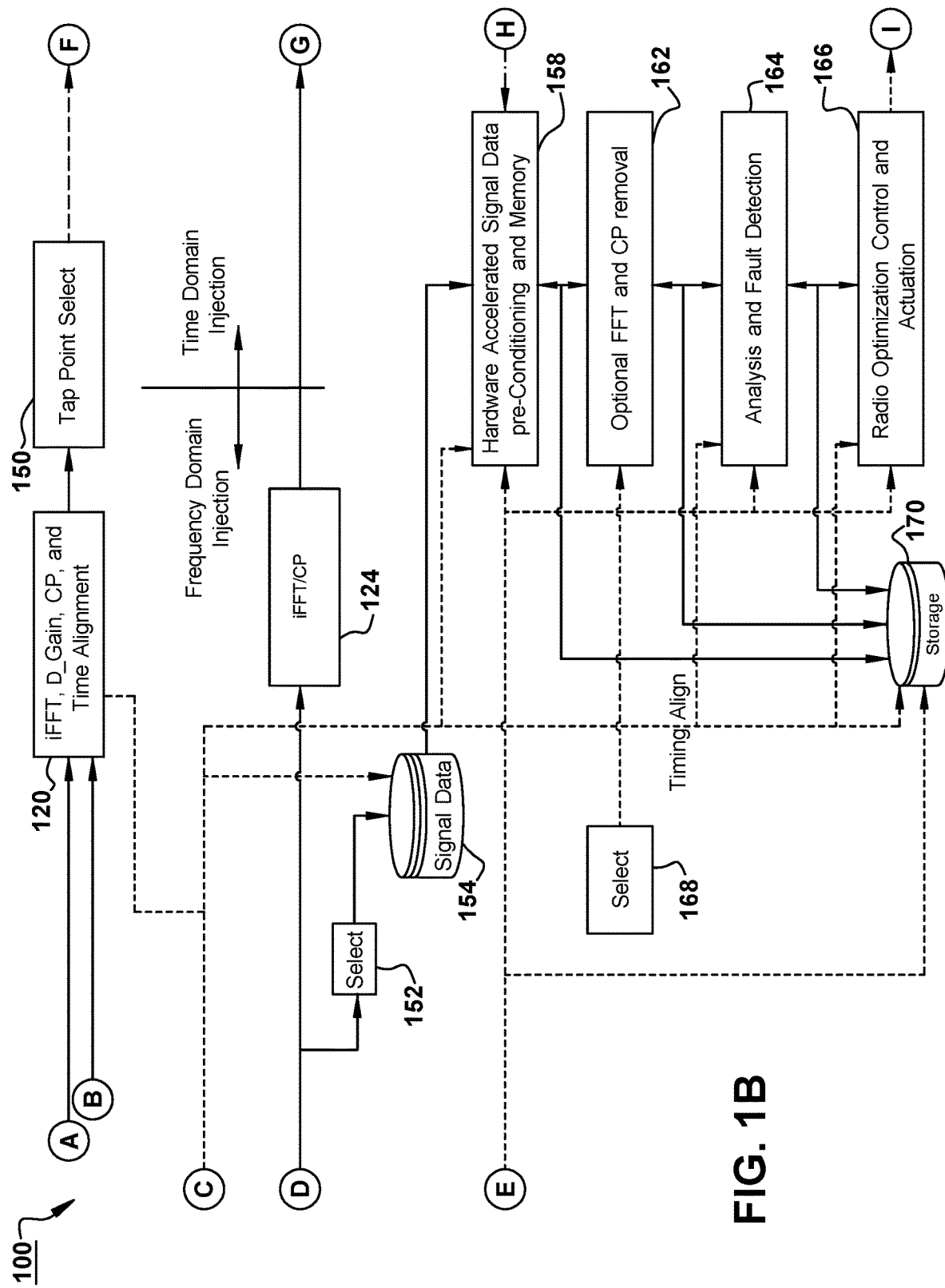
Figure 1C:
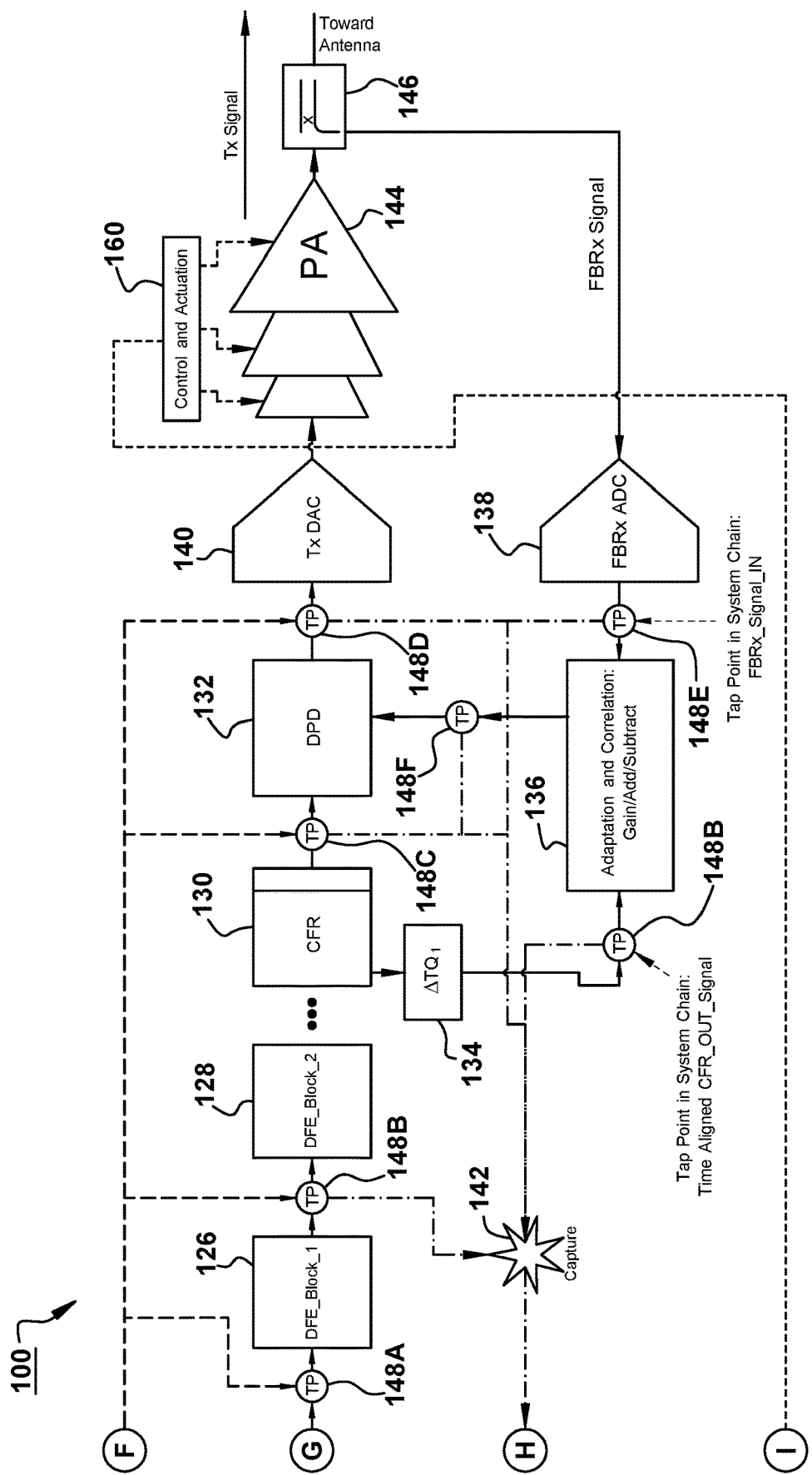

FIG. 1A, FIG. 1B, and FIG. 1C illustrate an example system architecture 100 that can facilitate fine tuning amplifier performance, in accordance with an embodiment of this disclosure.

System architecture 100 can function as a down link signal path of a radio. As depicted, system architecture 100 comprises custom signal data memory, generation, masking, and buffer 102 (which can comprise a combination of some or all of a look up table, a pseudo-random look up table generator, a generator, a memory, an OR gate to combine data sources, masking, and a buffer), time alignment 116, custom symbol resource bands/resource elements (RBs/REs) 118, inverse Fast Fourier Transform (iFFT) 120 (which can also perform Δ gain, time alignment, and optional cyclic prefix (CP) insertion), RB/RE 122, iFFT/CP 124, digital front end (DFE) block 1 126, DFE block 2 128, crest factor reduction (CFR) 130, digital pre-distortion (DPD) 132, delta-time-phase (ΔTΘ) 134, adaptation and correlation 136, feedback receiver analog-to-digital converter (FBRx ADC) 138, transmitter digital to-analog converter (Tx ADC) 140, capture 142, power amplifier 144, signal coupler 146, tap point 148A, tap point 148B, tap point 148C, tap point 148D, tap point 148E, tap point 148F (which can be accessed to capture a FBRx Signal IN), tap point 148G (which can be accessed to capture a CFR OUT Signal), tap point select 150, select 152, signal data 154, AND/OR 156, hardware accelerated signal data pre-conditioning and memory 158, optional FFT and CP removal 162, analysis and fault detection 164, radio optimization control and actuation 166, select 168, storage 170, U-plane 172, and C-plane, M-plane, and S-plane 174.

In different examples, different blocks of system architecture 100 can be implemented and/or used. For example, optional FFT and CP removal 162 can be selectively implemented and/or used to provide a time domain full signal (no FFT, and no CP removal); to provide time domain data only (no FFT, with CP removal); to provide frequency domain of a whole signal (with FFT, no CP removal); and/or frequency domain data only (with FFT, with CP removal).

In system architecture 100, radio optimization control and actuation 166 can read incident signal data traveling through system architecture 100, and use it to modify an operating parameter of system architecture 100.

System architecture 100 can be implemented to provide a clean signal with certain characteristics (e.g., modulation coding schemes (MCSes), peak-to-average ratios, traffic load level, etc.); to capture a signal after passing through some radio blocks; to implement an analysis block that can analyze results, as well as time aligning or storing a clean signal (where the signal, once time aligned, can be available to compare to a captured signal to produce real-time difference analysis for key values used to define, and cause to be executed, operational state changes); to implement a deterministic or prescriptive block that provides for updates to flow directly from this block. In system architecture 100, a follow up can indicate that a new operational state performance measurement meets criteria to hold that state, or results in a further update.

Figure 2:
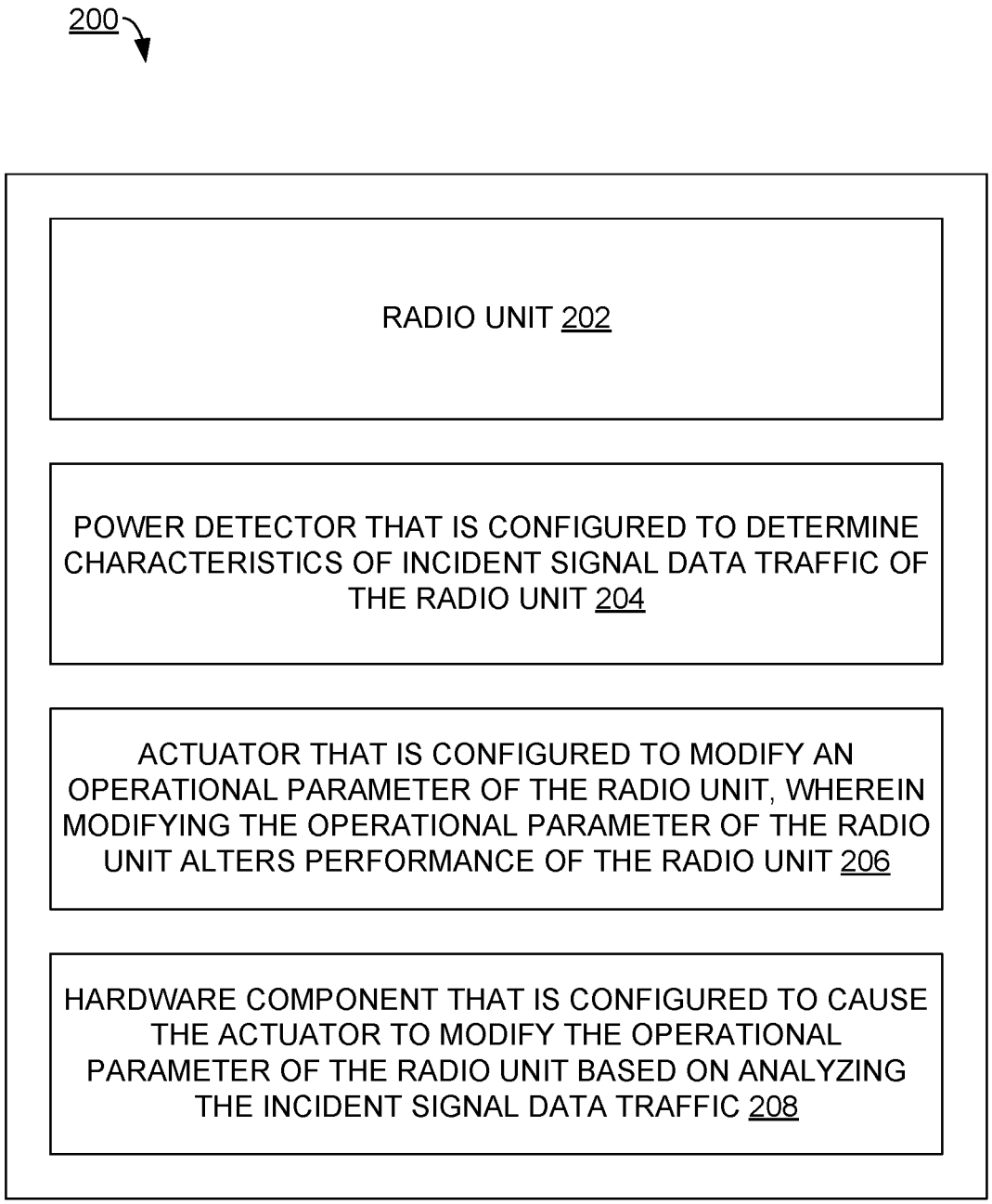
FIG. 2 illustrates another example system architecture that can facilitate fine tuning amplifier performance, in accordance with an embodiment of this disclosure.

FIG. 2 illustrates another example system architecture 200 that can facilitate fine tuning amplifier performance, in accordance with an embodiment of this disclosure. In some examples, part(s) of system architecture 200 can be used to implement part(s) of system architecture 100 of FIGS. 1A, 1B, and 1C.

System architecture comprises radio unit 202; power detector that is configured to determine characteristics of incident signal data traffic of the radio unit 204; actuator that is configured to modify an operational parameter of the radio unit, wherein modifying the operational parameter of the radio unit alters performance of the radio unit 206; and hardware component that is configured to cause the actuator to modify the operational parameter of the radio unit based on analyzing the incident signal data traffic 208.

In some examples, radio unit 202 can be similar to system architecture 100 of FIGS. 1A, 1B, and 1C. In some examples, power detector that is configured to determine characteristics of incident signal data traffic of the radio unit 204 can be similar to analysis and fault detection 164. In some examples, actuator that is configured to modify an operational parameter of the radio unit, wherein modifying the operational parameter of the radio unit alters performance of the radio unit 206 can be similar to radio optimization control and actuation 166. In some examples, hardware component that is configured to cause the actuator to modify the operational parameter of the radio unit based on analyzing the incident signal data traffic 208 can be similar to control and actuation 160.

In some examples, the incident signal data traffic comprises live-air data. In some examples, the incident signal data traffic comprises non-live air data. In some examples, the incident signal data traffic comprises a hybrid of live-air data and non-live-air data. That is, the incident signal data traffic can comprise mission-mode data, non-mission-mode data, or a hybrid of the two.

In some examples, modifying the operational parameter of the radio unit improves an efficiency of energy consumption of the radio unit. For example, a power amplifier (e.g., power amplifier 144) can have its energy consumption reduced during a period where data can be successfully transmitted by the radio at a lower power level.

In some examples, the operational parameter comprises error vector magnitude (EVM) data. EVM data can be used by a radio system to quantify a performance of a transmitter or a receiver of a radio unit. With regard to EVM and OBUE, data can be captured at an output of a FBRx ADC, in addition to analysis of incident data.

In some examples, the operational parameter comprises operating band unwanted emission (OBUE) data. OBUE data can be used by a radio system to quantify an amount of unwanted emissions in a down link operating band.

FIG. 3 illustrates another example system architecture 300 that can facilitate fine tuning amplifier performance, in accordance with an embodiment of this disclosure. In some examples, part(s) of system architecture 300 can be used to implement part(s) of system architecture 100 of FIGS. 1A, 1B, and 1C.

System architecture 300 comprises first hardware component that is configured to determine incident signal data traffic that travels through a radio unit 302; and second hardware component that is configured to cause an actuator of the radio unit to modify the operational parameter of the radio unit based on analyzing the incident signal data traffic that travels through the radio unit 304.

In some examples, first hardware component that is configured to determine incident signal data traffic that travels through a radio unit 302 can be similar to analysis and fault detection 164. In some examples, second hardware component that is configured to cause an actuator of the radio unit to modify the operational parameter of the radio unit based on analyzing the incident signal data traffic that travels through the radio unit 304 can be similar to control and actuation 160.

In some examples, the first hardware component and the second hardware component are configured to operate independently of a distributed unit. That is, these components can be part of a radio unit of a radio system, and provide an ability for a radio unit to operate opportunistically and autonomously without interaction with a distributed unit.

FIG. 4 illustrates another example system architecture 400 that can facilitate fine tuning amplifier performance, in accordance with an embodiment of this disclosure. In some examples, part(s) of system architecture 400 can be used to implement part(s) of system architecture 100 of FIGS. 1A, 1B, and 1C.

System architecture 400 comprises first hardware component that is configured to determine incident signal data traffic of a radio unit 402 (which can be similar to first hardware component that is configured to determine incident signal data traffic that travels through a radio unit 302 of FIG. 3); second hardware component that is configured to cause an actuator of the radio unit to modify the operational parameter of the radio unit based on analyzing the incident signal data traffic 404 (which can be similar to second hardware component that is configured to cause an actuator of the radio unit to modify the operational parameter of the radio unit based on analyzing the incident signal data traffic that travels through the radio unit 304); and third hardware component that is configured to inject a custom signal in a radio signal chain of the radio unit, wherein the incident signal data traffic is based on the custom signal 406.

Third hardware component that is configured to inject a custom signal in a radio signal chain of the radio unit, wherein the incident signal data traffic is based on the custom signal 406 can provide an ability to inject custom waveforms or signals at points in a radio signal chain. Third hardware component that is configured to inject a custom signal in a radio signal chain of the radio unit, wherein the incident signal data traffic is based on the custom signal 406 can be similar to custom signal data memory, generation, masking, and buffer 102 of FIGS. 1A, 1B, and 1C.

FIG. 5 illustrates another example system architecture 500 that can facilitate fine tuning amplifier performance, in accordance with an embodiment of this disclosure. In some examples, part(s) of system architecture 500 can be used to implement part(s) of system architecture 100 of FIGS. 1A, 1B, and 1C.

System architecture 500 comprises first hardware component that is configured to determine incident signal data traffic of a radio unit 502 (which can be similar to first hardware component that is configured to determine incident signal data traffic that travels through a radio unit 302 of FIG. 3); second hardware component that is configured to cause an actuator of the radio unit to modify the operational parameter of the radio unit based on analyzing the incident signal data traffic 504 (which can be similar to second hardware component that is configured to cause an actuator of the radio unit to modify the operational parameter of the radio unit based on analyzing the incident signal data traffic that travels through the radio unit 304); and third hardware component that is configured to capture two simultaneous time aligned blocks of different data from tap points in a digital front end chain of the radio unit, wherein the incident signal data traffic is based on the two simultaneous time aligned blocks of different data 508.

Third hardware component that is configured to capture two simultaneous time aligned blocks of different data from tap points in a digital front end chain of the radio unit, wherein the incident signal data traffic is based on the two simultaneous time aligned blocks of different data 508 can capture two or more simultaneously time-aligned blocks of different data from tap points in a digital front end chain before passing to an analysis block. Third hardware component that is configured to capture two simultaneous time aligned blocks of different data from tap points in a digital front end chain of the radio unit, wherein the incident signal data traffic is based on the two simultaneous time aligned blocks of different data 508 can be similar to capture 142 of FIGS. 1A, 1B, and 1C, which can capture data from tap points such as tap point 148A, tap point 148B, tap point 148C, tap point 148D, tap point 148E, tap point 148F, and/or tap point 148G.

Figure 6:
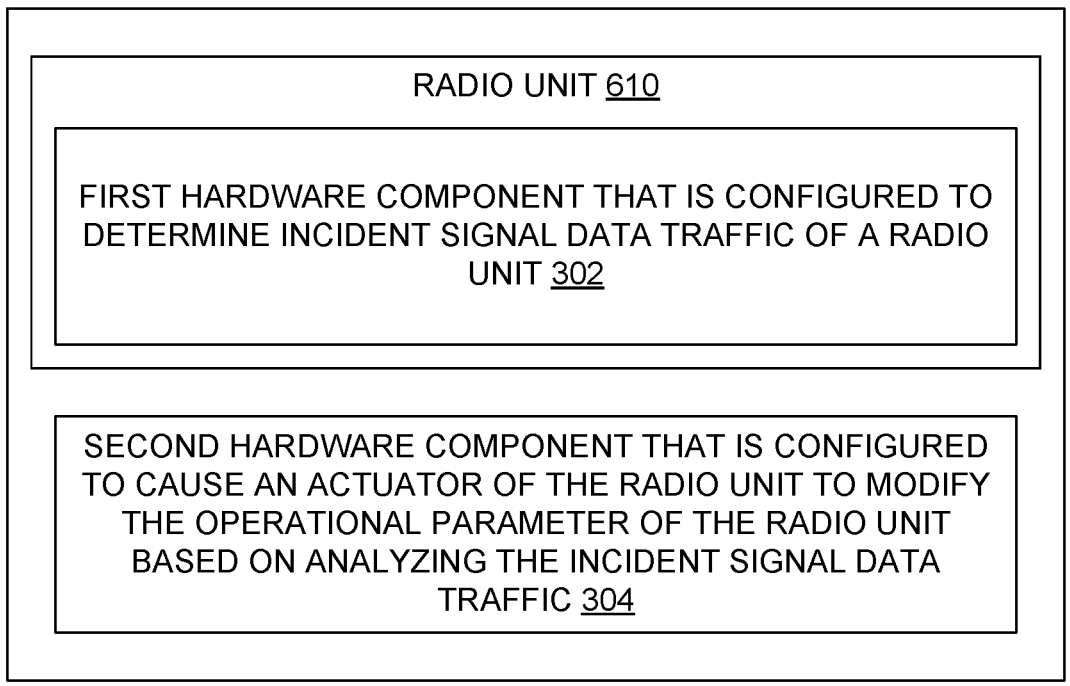
FIG. 6 illustrates another example system architecture that can facilitate fine tuning amplifier performance, in accordance with an embodiment of this disclosure.

FIG. 6 illustrates another example system architecture 600 that can facilitate fine tuning amplifier performance, in accordance with an embodiment of this disclosure. In some examples, part(s) of system architecture 600 can be used to implement part(s) of system architecture 100 of FIGS. 1A, 1B, and 1C.

System architecture 600 comprises first hardware component that is configured to determine incident signal data traffic of a radio unit 602 (which can be similar to first hardware component that is configured to determine incident signal data traffic that travels through a radio unit 302 of FIG. 3); second hardware component that is configured to cause an actuator of the radio unit to modify the operational parameter of the radio unit based on analyzing the incident signal data traffic 604 (which can be similar to second hardware component that is configured to cause an actuator of the radio unit to modify the operational parameter of the radio unit based on analyzing the incident signal data traffic that travels through the radio unit 304); and radio unit 610.

That is, internal-radio unit analysis and messaging can be performed to improve radio performance by adjusting operating parameters. Using the example of FIGS. 1A, 1B, and 1C, where system architecture 100 generally comprises a radio unit, system architecture 100 comprises analysis and fault detection 164, which can be similar to first hardware component that is configured to determine incident signal data traffic that travels through a radio unit 302 can be similar to analysis and fault detection 164. System architecture 100 also comprises control and actuation 160, which can be similar to second hardware component that is configured to cause an actuator of the radio unit to modify the operational parameter of the radio unit based on analyzing the incident signal data traffic that travels through the radio unit 304.

Example Process Flows

Figure 7:
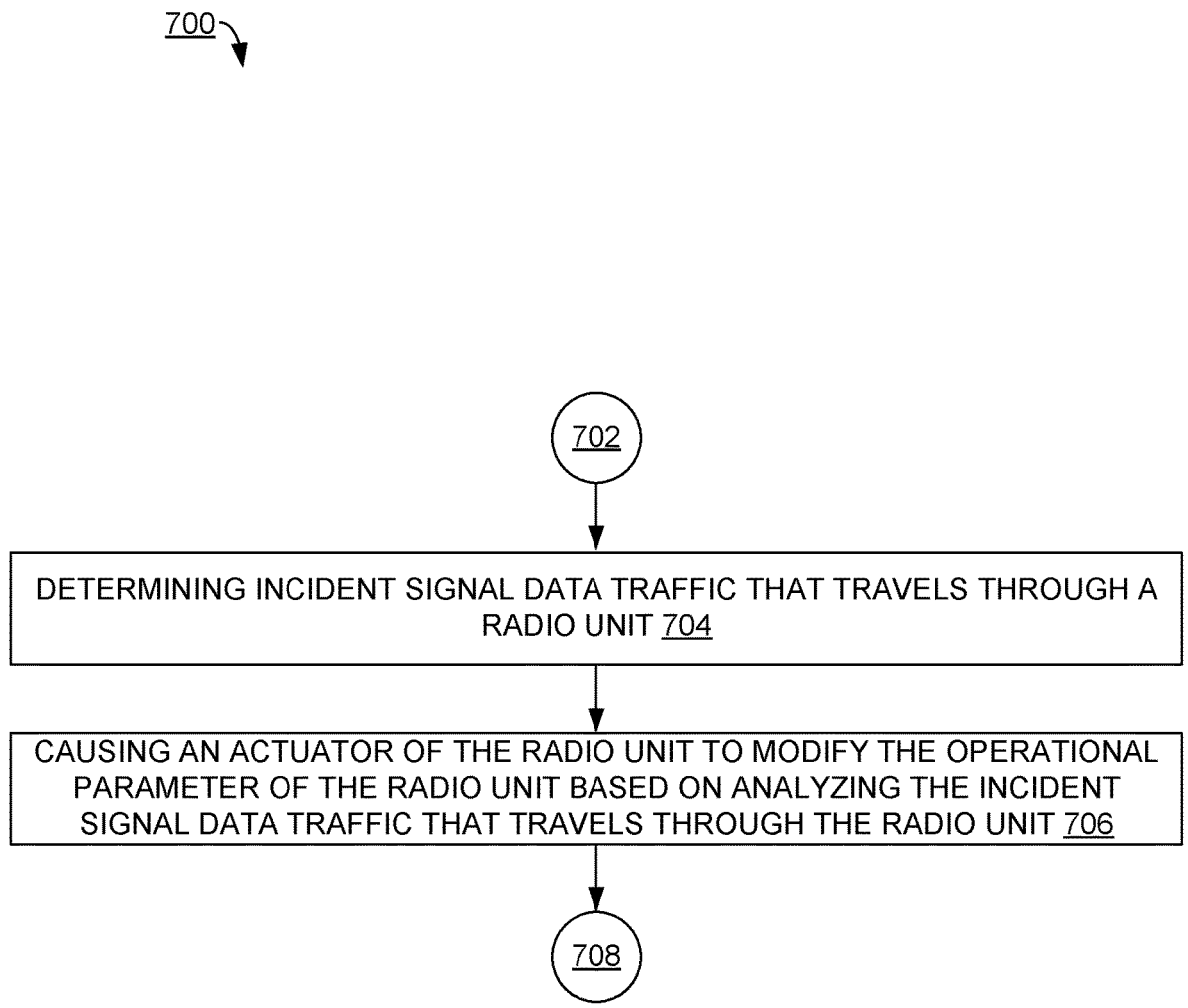
FIG. 7 illustrates an example process flow that can facilitate fine tuning amplifier performance, in accordance with an embodiment of this disclosure.

FIG. 7 illustrates an example process flow 700 that can facilitate fine tuning amplifier performance, in accordance with an embodiment of this disclosure. In some examples, one or more embodiments of process flow 700 can be implemented by system architecture 100 of FIGS. 1A, 1B, and 1C.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 800 of FIG. 8, process flow 900 of FIG. 9, and/or process flow 1000 of FIG. 10.

Process flow 700 begins with 702, and moves to operation 704. Operation 704 depicts analyzing incident signal data traffic that travels through a radio unit. In some examples, operation 704 can be implemented in a similar manner as performed by power detector that is configured to determine characteristics of incident signal data traffic of the radio unit 204 of FIG. 2.

In some examples, the incident signal data traffic is represented in a frequency domain. In some examples, the incident signal data traffic is represented in a time domain. That is, process flow 800 can provide an ability to capture, analyze, and store frequency and/or time domain data to facilitate tuning or fine tuning radio performance parameters.

After operation 704, process flow 700 moves to operation 706.

Operation 706 depicts causing an actuator of the radio unit to modify the operational parameter of the radio unit based on analyzing the incident signal data traffic that travels through the radio unit. In some examples, operation 706 can be implemented in a similar manner as performed by hardware component that is configured to cause the actuator to modify the operational parameter of the radio unit based on analyzing the incident signal data traffic 208.

In some examples, causing the actuator of the radio unit to modify the operational parameter of the radio unit comprises changing a power amplifier bias of the radio unit to lower power consumption of the radio unit by controlling a supply voltage of the radio unit and a gate bias of the radio unit. That is, a radio unit can perform a change to a power amplifier bias via actuators to control \Tad and/or gate biases for improving (e.g., lessening) power consumption of a radio.

In some examples, causing the actuator of the radio unit to modify the operational parameter of the radio unit comprises changing a crest factor reduction of the radio unit to lower power consumption of the radio unit. That is, a radio unit can modify crest factor reduction parameters to improve (i.e., lessen) radio power consumption.

After operation 706, process flow 700 moves to 708, where process flow 700 ends.

Figure 8:
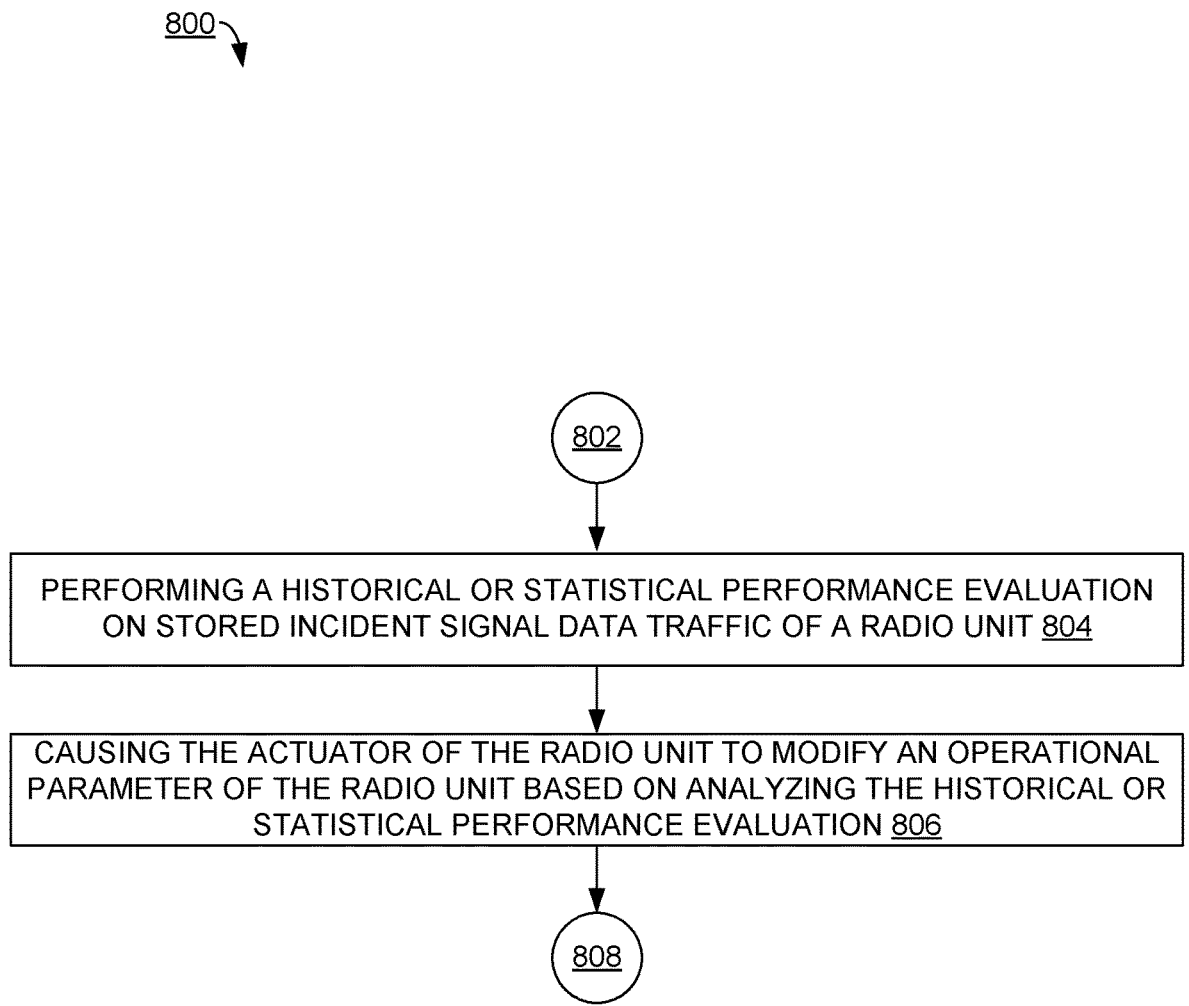
FIG. 8 illustrates another example process flow that can facilitate fine tuning amplifier performance, in accordance with an embodiment of this disclosure.

FIG. 8 illustrates another example process flow 800 that can facilitate fine tuning amplifier performance, in accordance with an embodiment of this disclosure. In some examples, one or more embodiments of process flow 800 can be implemented by system architecture 100 of FIGS. 1A, 1B, and 1C.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 700 of FIG. 7, process flow 900 of FIG. 9, and/or process flow 1000 of FIG. 10.

Process flow 800 begins with 802, and moves to operation 804. Operation 804 depicts performing a historical or statistical performance evaluation on stored incident signal data traffic of a radio unit. That is, signal data and subsequent use can be performed for near- and/or long-term historical and/or statistical performance evaluation to modify operating parameters of a radio.

In some examples, operation 804 can be implemented by analysis and fault detection 164 of FIGS. 1A, 1B, and 1C.

After operation 804, process flow 800 moves to operation 806.

Operation 806 depicts causing the actuator of the radio unit to modify an operational parameter of the radio unit based on analyzing the historical or statistical performance evaluation. In some examples, operation 806 can be performed by radio optimization control and actuation 166 of FIGS. 1A, 1B, and 1C and/or control and actuation 160.

After operation 806, process flow 800 moves to 808, where process flow 800 ends.

Figure 9:
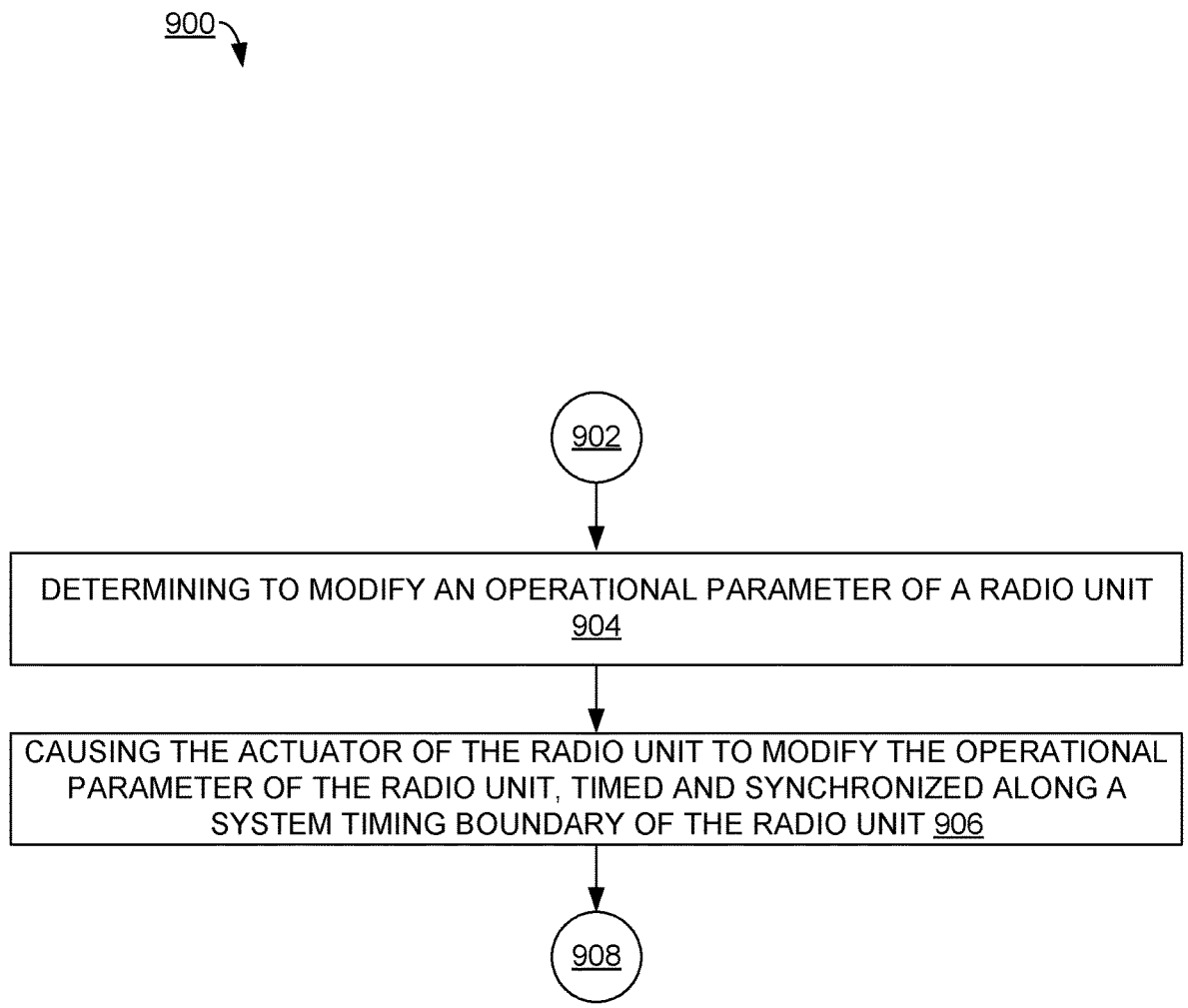
FIG. 9 illustrates another example process flow that can facilitate fine tuning amplifier performance, in accordance with an embodiment of this disclosure.

FIG. 9 illustrates another example process flow 900 that can facilitate fine tuning amplifier performance, in accordance with an embodiment of this disclosure. In some examples, one or more embodiments of process flow 900 can be implemented by system architecture 100 of FIGS. 1A, 1B, and 1C.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 700 of FIG. 7, process flow 800 of FIG. 8, and/or process flow 1000 of FIG. 10.

Process flow 900 begins with 902, and moves to operation 902. Operation 904 depicts determining to modify an operational parameter of a radio unit. This can be performed based on incident signal data traffic, and can be performed by analysis and fault detection 164 of FIGS. 1A, 1B, and 1C.

After operation 904, process flow 900 moves to operation 906.

Operation 906 depicts causing the actuator of the radio unit to modify the operational parameter of the radio unit, timed and synchronized along a system timing boundary of the radio unit. That is, operational parameter modifications can be timed and synchronized along system timing boundaries.

After operation 906, process flow 900 moves to 908, where process flow 900 ends.

Figure 10:
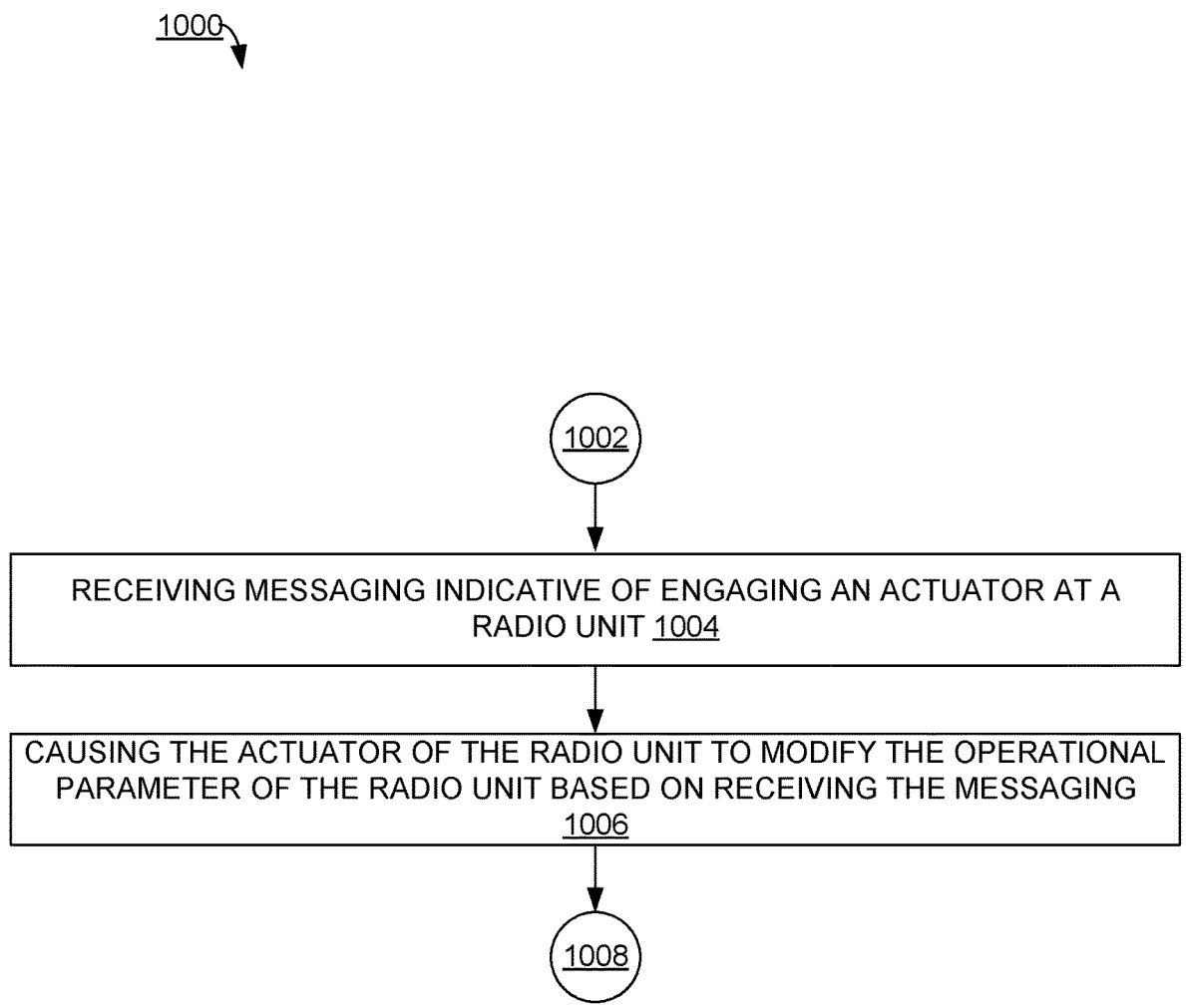
FIG. 10 illustrates another example process flow that can facilitate fine tuning amplifier performance, in accordance with an embodiment of this disclosure.

FIG. 10 illustrates another example process flow 1000 that can facilitate fine tuning amplifier performance, in accordance with an embodiment of this disclosure. In some examples, one or more embodiments of process flow 1000 can be implemented by system architecture 100 of FIGS. 1A, 1B, and 1C.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of process flow 700 of FIG. 7, process flow 800 of FIG. 8, and/or process flow 900 of FIG. 9.

Process flow 1000 begins with 1002, and moves to operation 1004. Operation 1004 depicts receiving messaging indicative of engaging an actuator at a radio unit. That is, messaging received at a radio unit can be used to determine to reconfigure operational parameters as controlled by actuators. In some examples, operation 1004 can be performed by radio optimization control and actuation 166 of FIGS. 1A, 1B, and 1C.

After operation 1004, process flow 1000 moves to operation 1006.

Operation 1006 depicts causing the actuator of the radio unit to modify the operational parameter of the radio unit based on receiving the messaging. Using the example of FIGS. 1A, 1B, and 1C, radio optimization control and actuation 166 can cause control and actuation 160 to modify an operational parameter of power amplifier 144 of a radio unit of system architecture 100.

After operation 1006, process flow 1000 moves to 1008, where process flow 1000 ends.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein. As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a radio unit;
   a power detector that is configured to determine characteristics of incident signal data traffic of the radio unit;
   an actuator that is configured to modify an operational parameter of the radio unit, wherein modifying the operational parameter of the radio unit alters performance of the radio unit, and wherein the operational parameter of the radio unit comprises error vector magnitude data or operating band unwanted emission data; and
   a hardware component that is configured to cause the actuator to modify the operational parameter of the radio unit based on analyzing the incident signal data traffic.

2. The system of claim 1, wherein the incident signal data traffic comprises live-air data.

3. The system of claim 1, wherein the incident signal data traffic comprises non-live air data.

4. The system of claim 1, wherein the incident signal data traffic comprises a hybrid of live-air data and non-live-air data.

5. The system of claim 1, wherein modifying the operational parameter of the radio unit improves an efficiency of energy consumption of the radio unit.

6. The system of claim 1, wherein causing the actuator of the radio unit to modify the operational parameter of the radio unit is timed and synchronized along a system timing boundary of the radio unit.

7. The system of claim 1, wherein the hardware component is a first hardware component, and further comprising:
   a second hardware component that is configured to inject a custom signal in a radio signal chain of the radio unit, wherein the incident signal data traffic is based on the custom signal.

8. A method, comprising:
   analyzing, by a system comprising at least one processor, incident signal data traffic that passes through a radio unit; and
   causing, by the system, an actuator of the radio unit to modify an operational parameter of the radio unit based on analyzing the incident signal data traffic that passes through the radio unit, and wherein the operational parameter of the radio unit comprises error vector magnitude data or operating band unwanted emission data.

9. The method of claim 8, further comprising:
   performing, by the system, a historical or statistical performance evaluation on stored incident signal data traffic of the radio unit; and
   causing, by the system, the actuator of the radio unit to modify the operational parameter of the radio unit based on analyzing the historical or statistical performance evaluation.

10. The method of claim 8, wherein the incident signal data traffic is represented in a frequency domain.

11. The method of claim 8, wherein the incident signal data traffic is represented in a time domain.

12. The method of claim 8, wherein causing the actuator of the radio unit to modify the operational parameter of the radio unit is timed and synchronized along a system timing boundary of the radio unit.

13. The method of claim 8, further comprising:
   causing, by the system, the actuator of the radio unit to modify the operational parameter of the radio unit based on receiving messaging indicative of engaging the actuator at the radio unit.

14. The method of claim 8, wherein causing the actuator of the radio unit to modify the operational parameter of the radio unit comprises changing a power amplifier bias of the radio unit to lower power consumption of the radio unit by controlling a supply voltage of the radio unit and a gate bias of the radio unit.

15. The method of claim 8, wherein causing the actuator of the radio unit to modify the operational parameter of the radio unit comprises changing a crest factor reduction of the radio unit to lower power consumption of the radio unit.

16. An apparatus, comprising:
   first hardware that is configured to determine incident signal data traffic that travels through a radio unit; and
   second hardware that is configured to cause an actuator of the radio unit to modify an operational parameter of the radio unit based on analyzing the incident signal data traffic that travels through the radio unit, wherein the operational parameter of the radio unit comprises error vector magnitude data or operating band unwanted emission data.

17. The apparatus of claim 16, wherein the first hardware and the second hardware are configured to operate independently of a distributed unit.

18. The apparatus of claim 16, further comprising:
   third hardware that is configured to inject a custom signal in a radio signal chain of the radio unit, wherein the incident signal data traffic is based on the custom signal.

19. The apparatus of claim 16, further comprising:
   third hardware that is configured to capture two simultaneous time aligned blocks of different data from tap points in a digital front end chain of the radio unit, wherein the incident signal data traffic is based on the two simultaneous time aligned blocks of different data.

20. The apparatus of claim 16, wherein the first hardware is part of the radio unit.

* * * * *